I. Hobson.
Upsetting Tires.
N° 20,559. Patented Jun. 15, 1858.
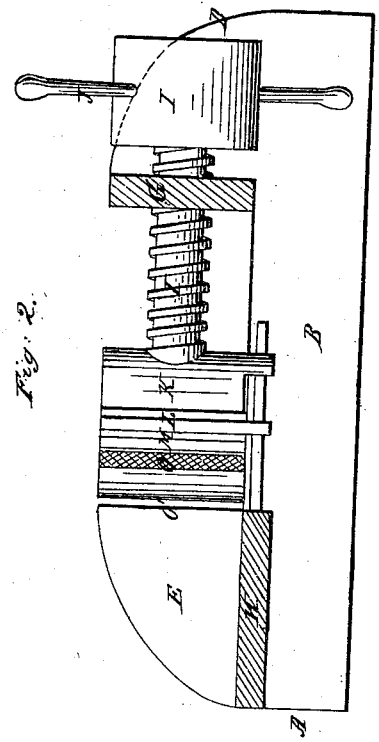
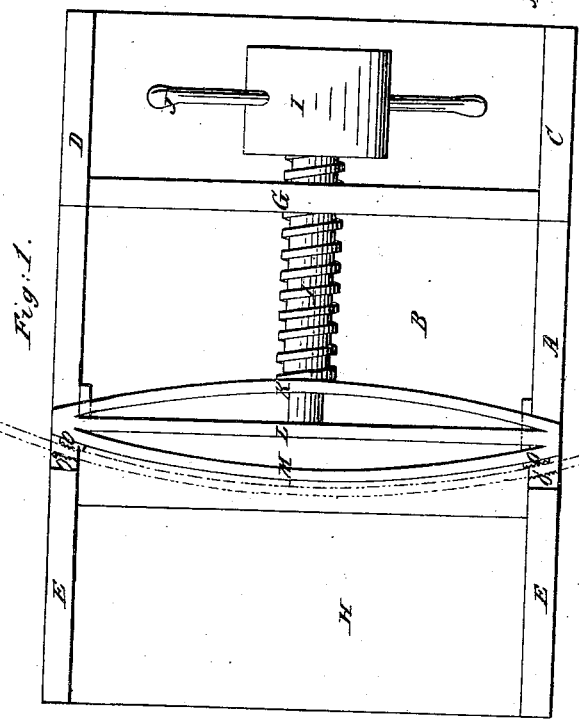

UNITED STATES PATENT OFFICE.

IRIS HOBSON, OF STOUTS GROVE, ILLINOIS.

REDUCING WHEEL-TIRES.

Specification of Letters Patent No. 20,559, dated June 15, 1858.

*To all whom it may concern:*

Be it known that I, IRIS HOBSON, of Stouts Grove, in the county of McLean and State of Illinois, have invented a new and useful Improvement in Machines for Reducing the Size of Wheel-Tires; and I do hereby declare that the following is a full, clear, and exact description of the same, reference being had to the accompanying drawings, forming a part of this specification, in which—

Figure 1, is a plan or top view of the machine. Fig. 2, is a vertical, longitudinal section of the same.

Similar letters of reference in each of the several figures indicate corresponding parts.

This invention relates to that class of tire upsetting machines which come into operation after the tire has been bulged out, to the extent it is desired to reduce the diameter of the tire, at one point of its circumference; said machines taking hold upon the tire at two points which are on opposite sides of the bulged portion and holding the same firmly until the bulged metal has been hammered down and the tire brought to its circular form on the anvil.

The nature of my invention consists in a sliding curved anvil formed of one straight and two semielliptic spring bars and furnished with two holding jaws, in combination with two toothed stationary jaws and a vise screw.

By having the anvil constructed of a series of spring bars instead of making it solid it is capable of conforming to any irregularities or eccentricities of the inner circle of the tire, and thus a bearing upon all parts is obtained, and also a spring or yielding anvil for hammering down the bulging metal upon furnished, and thus the thread of the screw saved from being stripped off by concussion during the said hammering operation. And by having the moving toothed jaws attached to the anvil the machine is simplified and the clamping of the tire facilitated.

To enable others, skilled in the art to make and use my invention, I will proceed to describe its construction and operation.

The machine is composed of a strong framework consisting of two bed pieces marked in the drawings A, and B; on both ends of each there being strong shoulders marked C, D, E, F, rising above and at right angles with the bed pieces; the shoulders on each piece facing each other. The bed pieces are firmly connected with strong beams in the following manner, to wit; at one end of the bed pieces the beam G, is placed upon the bed pieces and against the shoulders C, D, and firmly secured thereto. At the other end they are connected by a strong beam marked H, its upper surface being on a line with the upper surface of the bed pieces and just below the shoulders E, F. Through the beam G, passes a strong screw I, the beam G, serving as a nut to the screw, through the head of which passes the lever J. The screw plays against and is connected to an anvil marked K, L, M, which slides back and forth between the shoulders and upon the bed pieces being guided by flanges of the anvil. The anvil consists of three spring bars K, L, M, which are firmly connected at their ends. The middle spring bar L, is straight while the spring bar K, next to the screw is of a circular form and presents its concave surface to the middle spring bar L. Through the bar K, the unthreaded end of the screw passes and bears against the middle bar L. The screw also bears against the bar K, by means of the shoulder. The third spring bar M, is made of a shape corresponding to that of the article to be upset or adjusted, for example; if it is to reduce the size of a wheel tire, it should be the arc of a circle equal to the circumference of the wheel.

The length and width of the anvil may vary according to the form of the article to be adjusted, each piece to be made of iron or steel, in such a manner that it shall be capable of yielding to the concussion of the hammer and thus relieve the screw thread of the full force of the blow, and also that it may conform to the irregularities of the inner circle of the tire and thus have the tire bear on all parts of the anvil. The faces of the shoulders are covered with cast steel jaws O, O, presenting an inundated or toothed surface to the follower. Near each end of and upon the follower at right angles with its length is a narrow toothed cast steel jaw O' O' so placed that the dentated or toothed surfaces come in direct contact with the dentated surfaces of the shoulders and thus when the anvil is forced against the shoulders, the dentated surfaces in combination form a vise on each end of the follower.

The operation of reducing the diameter of a wheel tire one inch without cutting a piece out of it, is as follows: If the shoulders are sixteen inches apart, mark off seventeen inches on the tire, heat a few inches of the seventeen inches, place that part between the shoulders and the follower; press out the tire until the seventeen inches marked off on the tire shall be exactly within the follower. Screw up the follower and the dentated surfaces will hold the tire so firmly that it cannot slip; then hammer down the tire to the follower and there will be but sixteen inches of the tire between the shoulders, whereas before the hammering there was seventeen inches.

What I claim as my invention and desire to secure by Letters Patent, is—

The sliding curved anvil formed of one straight and two semi-elliptic spring bars K, L, M, and furnished with two holding jaws O, O, in combination with two toothed stationary jaws O', O', and a vise screw, I, substantially as and for the purposes set forth.

IRIS HOBSON.

Witnesses:
ELI MAXWELL,
WM. F. HODGE.